June 25, 1963 G. W. GILBERT 3,095,212
WEAPON TRANSFER DOLLY
Filed Dec. 29, 1960 7 Sheets-Sheet 1

INVENTOR
George W. Gilbert

BY
W. O. Quisenberry
Claude Funkhouser
ATTORNEYS

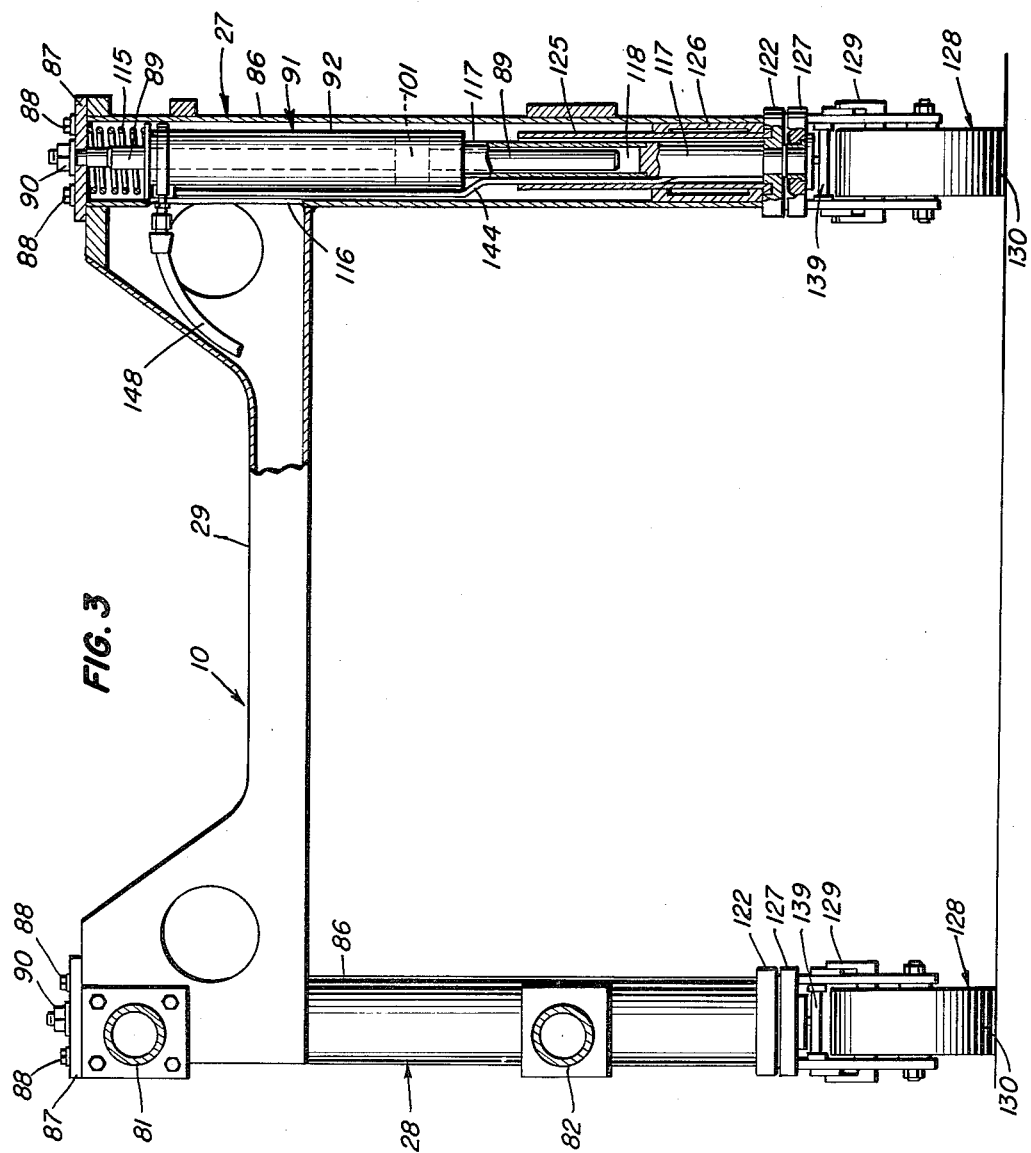

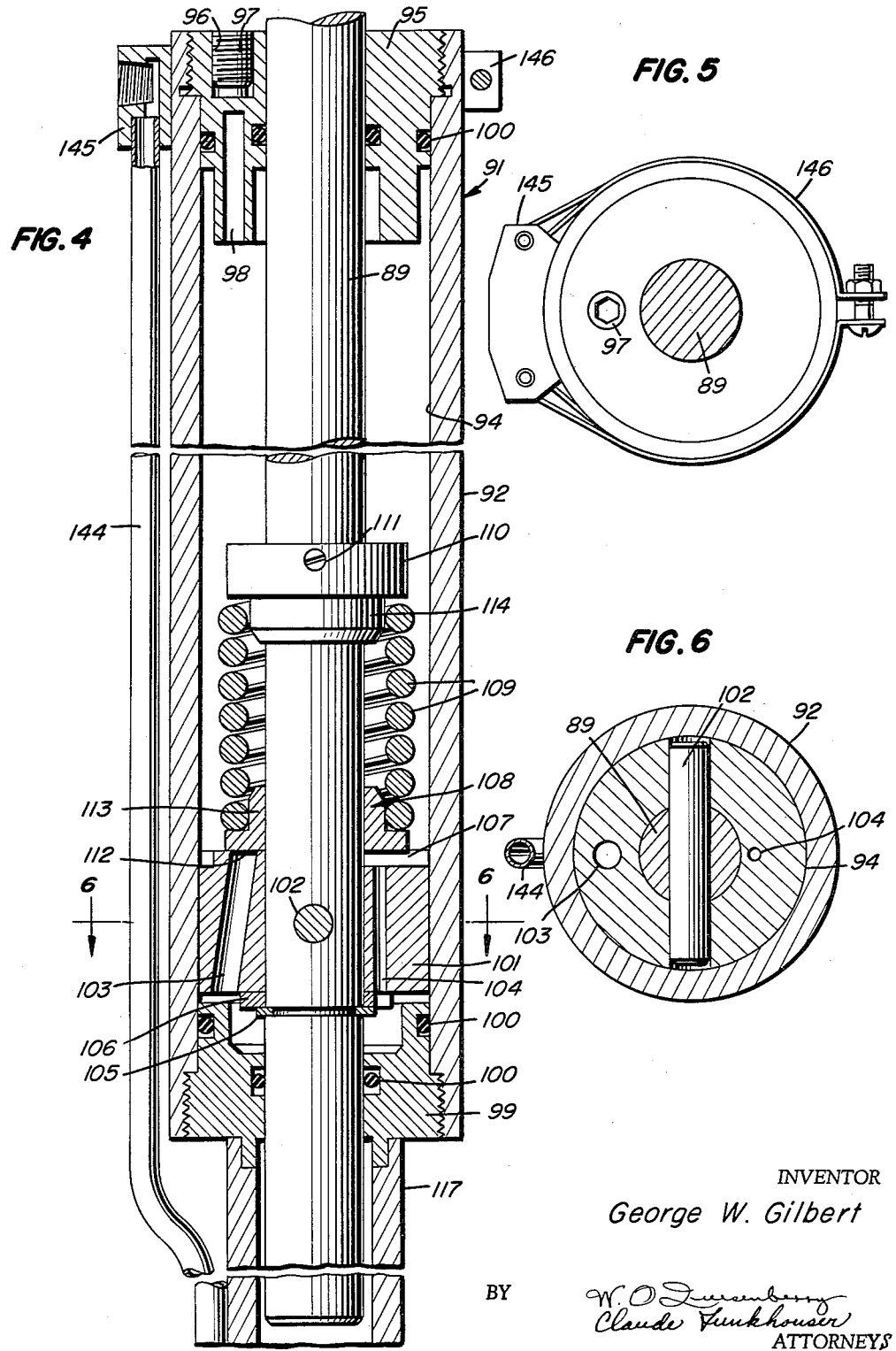

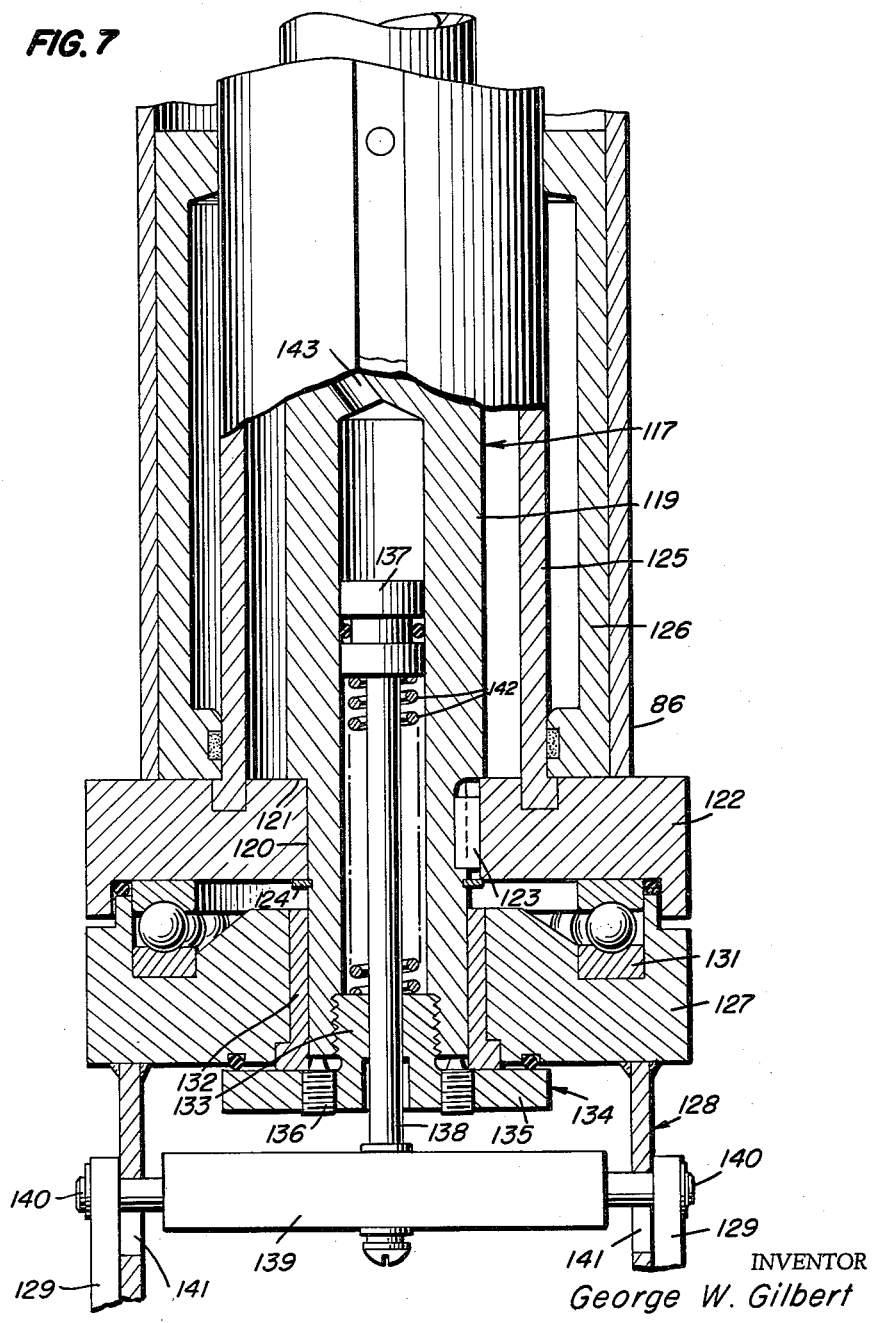

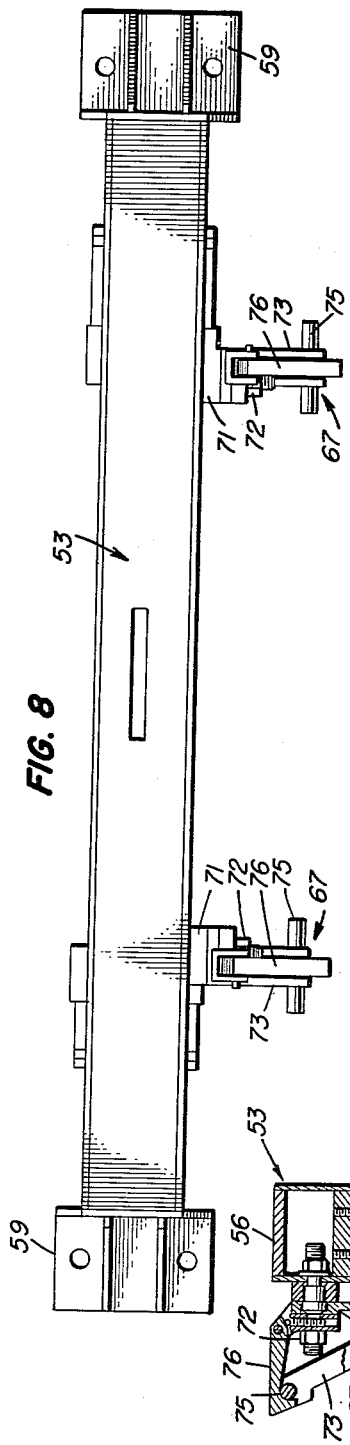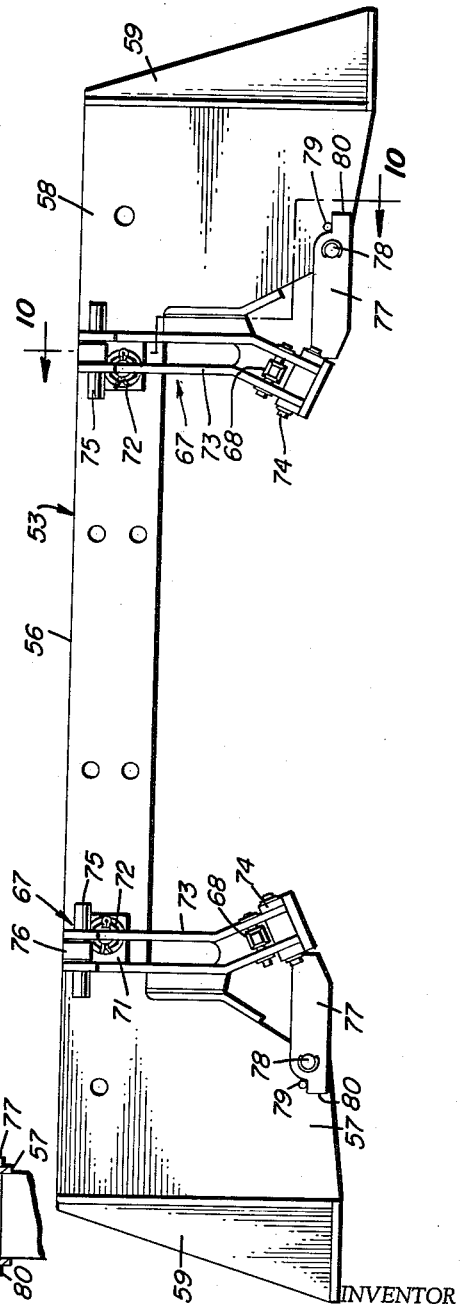

June 25, 1963

G. W. GILBERT 3,095,212

WEAPON TRANSFER DOLLY

Filed Dec. 29, 1960

INVENTOR
George W. Gilbert
BY
ATTORNEYS

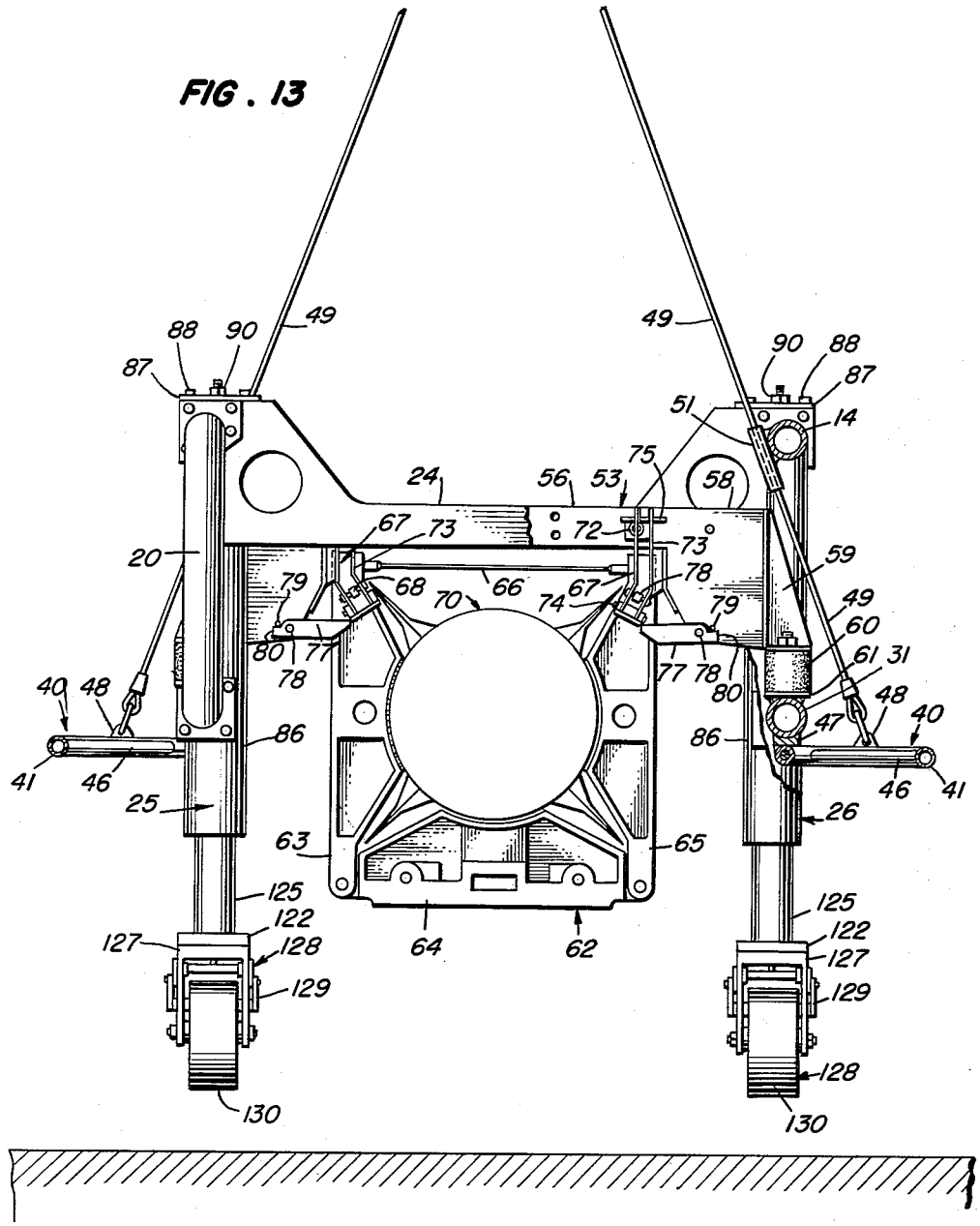

_United States Patent Office_

3,095,212
Patented June 25, 1963

3,095,212
WEAPON TRANSFER DOLLY
George W. Gilbert, Kensington, Md., assignor to the United States of America as represented by the Secretary of the Navy
Filed Dec. 29, 1960, Ser. No. 79,475
13 Claims. (Cl. 280—124)

The present invention relates to improvements in material handling dollies of the general class shown and described in U.S. Patent No. 2,950,123, and in U.S. patent application Serial No. 800,901, filed March 20, 1959, Eugene S. Culver, inventor, now U.S. Patent No. 2,996,310.

The material handling dollies shown and described in the above-referenced patent and patent application have proven very effective for the purpose of transferring ordnance missiles and missile components from ship to ship, from ship to shore, and from place to place on ship and at shore installations. Experience with these dollies, however, has made quite evident the need for a more compact dolly, and one which would be more flexible in the sense that it could be adapted for use with missile components of various types, or even with complete, self-contained relatively small missiles.

Important objects of the present invention, therefore, are to provide a material handling dolly that will be compact and of extremely rugged construction, and which may be adapted for handling ordnance missiles or missile components of various types.

Another object of the invention resides in the provision of a material handling dolly which incorporates improved shock absorbing apparatus.

A further object of the invention is to provide a material handling dolly which may be conveniently loaded or unloaded from below, as by a fork lift truck, an elevator, or by a special missile handling tool.

And as a still further object, the invention provides a material handling dolly that is fitted with means for receiving the wheels of another dolly thereabove, so that a plurality of dollies may be stacked in a relatively small space.

The invention provides, as a further object, a material handling dolly which incorporates safety bumpers for protecting the sides of the dolly and a missile or component therein from damage should the dolly strike another object while it is being moved from place to place, the safety bumpers being automatically raised into operative position when the dolly is elevated by a hoist or the like.

Other objects and many of the attendant advantages of the present invention will be readily appreciated as the same becomes better understood by reference to the following detailed description when considered in connection with the accompanying drawings, wherein:

FIG. 3 is an enlarged section on the line 3—3 of FIG. 2;

FIG. 4 is an enlarged vertical sectional view on the line 4—4 of FIG. 2, showing particularly the upper portion of one of the supporting leg assemblies with its built-in shock absorber;

FIG. 5 is a top plan view, partially in section, of the leg assembly shown in FIG. 4;

FIG. 6 is a transverse section in the line 6—6 of FIG. 4;

FIG. 7 is an enlarged vertical section on the line 7—7 of FIG. 2, showing in detail the caster wheel mount and the brake cylinder construction employed;

FIG. 8 is an enlarged top plan view of one of the component supporting yoke assemblies employed;

FIG. 9 is a side elevation of the yoke assembly shown in FIG. 8;

FIG. 10 is a detail section of the yoke assembly of FIGS. 8 and 9, on the line 10—10 of FIG. 9;

FIG. 13 is an enlarged end view, with some details in section, showing the improved dolly as it would appear elevated above a deck and with the safety bumpers raised to operative positions.

The improved material handling dolly constituting the present invention essentially comprises a body of heavy tubular construction which is so designed that it will largely surround a missile component being transported. The body includes spaced parallel side frames that are connected by transverse members, and the entire dolly is supported by leg assemblies which also function to brace the side frames and add rigidity and strength thereto. Shock absorbers are built into the leg assemblies and casters are swivelled on the lower ends thereof. Bumpers for protecting the sides of the dolly and a missile component being transported are hinged to the lower rails of the side frames and are so connected to the hoisting cables employed that elevation of the dolly by said cables will move the bumpers from positions depending from said lower rails to positions extending horizontally from the dolly. A simplified "dead man" brake mechanism functions to enable the dolly to be kept under control at all times when the dolly is on a ship's deck or other surface, and yoke structure including improved latch mechanism is employed for mounting a missile component within the dolly. The improved dolly is also designed to receive, as an adjunct, an adapter rail for supporting a missile in the dolly in such a manner that it may be moved directly from said dolly onto a launcher.

Figure 1:
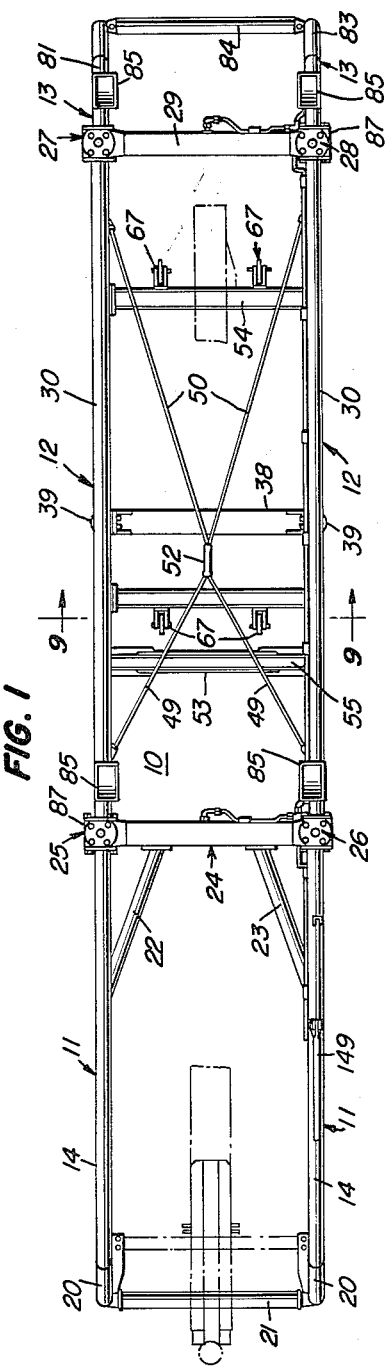
FIG. 1 is a top plan view of the improved dolly.
Figure 2:
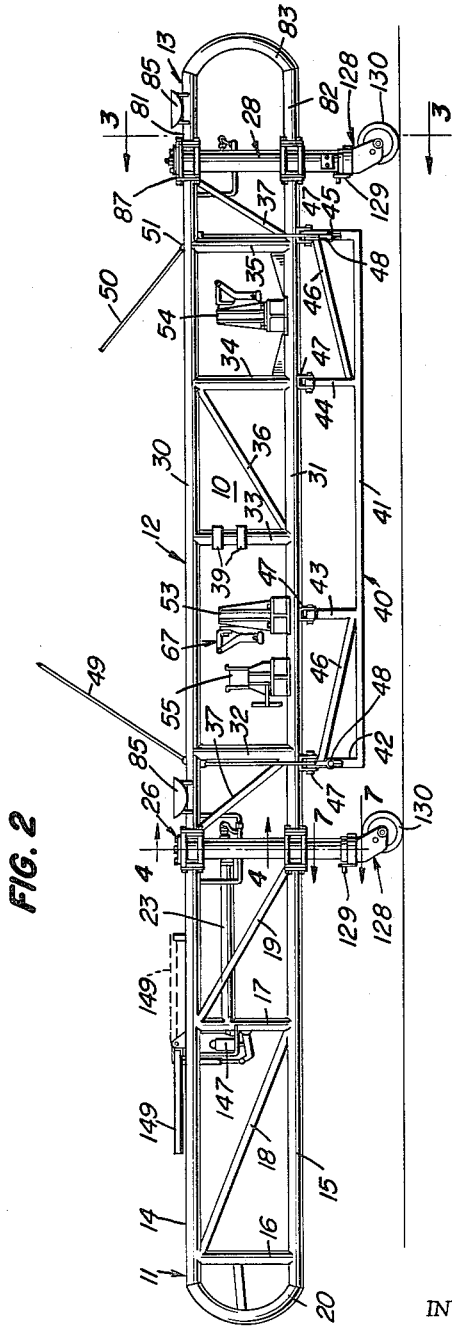
FIG. 2 is a side elevation of the dolly as it would appear at rest on a ship's deck or other supporting surface.

Referring now more particularly to the drawings, and first to FIGS. 1, 2, and 3 thereof, the improved missile handling dolly includes a body 10 which comprises pairs of spaced parallel fore, intermediate, and aft side frame sections 11, 12, and 13, each of heavy tubular construction. The fore side frame sections 11 each include upper and lower rails 14 and 15 which are spaced vertically by supports 16 and 17 and are braced by struts 18 and 19. The fore ends of the upper and lower rails 14 and 15 are connected by semicircular end rails 20. A connecting bar 21 extends transversely of the body between the midportions of the end rails 20, and braces 22 and 23 extend from the supports 17 of each fore frame section to intermediate points on a fore cross member 24, to be described in more detail hereinafter. Wheel brake actuating mechanism, also to be described hereinafter, is mounted on the support 17 adjacent the brace 23 and on the upper rail 14 located directly above said brace.

The fore cross member 24, as best seen in FIG. 13, is formed of heavy sheet metal, is of inverted U-shape in cross-section, and forms a part of a transverse support structure for the forward end of the dolly. The member 24 includes a pair of vertically disposed leg assemblies 25 and 26 which have connected thereto the aft ends of the upper and lower rails of the fore side frame sections 11. It will thus be seen that the leg assemblies, the fore side frame sections 11 with their struts and supports, the end bar 21, and the fore cross member 24 cooperate to provide a rigid forward frame structure for the dolly. The leg assemblies 25 and 26 also support the forward ends of the upper and lower rails of the intermediate side frame sections 12, the aft ends of said intermediate side frame rails being supported by leg assemblies 27 and 28 that are mounted at the opposite ends of an aft cross member 29 which is identical to the fore cross member 24. The leg assemblies 27 and 28 and the aft cross member 29 in a similar manner support the aft side frame sections 13.

Reference is again made to FIG. 2 for a more detailed description of the intermediate side frame sections 12. Each of the intermediate frame sections 12 includes an upper rail 30 and a lower rail 31 which, as stated previously, have their corresponding opposite ends connected to the four leg assemblies at vertically spaced points thereon. Rigidity is imparted to each intermediate side frame section by vertical supports 32, 33, 34 and 35 and by diagonal struts 36 and 37. A transverse brace 38 (FIG. 1) is bolted to sleeves 39 on the support 33. A generally rectangular safety bumper 40 is hinged to the lower rail 31 of each intermediate side frame section 12, and comprises an outer rail 41, spacer rails 42, 43, 44 and 45, and diagonal struts 46. As best seen in FIG. 13, the inner ends of the spacer rails are mounted to swing in hinge yokes 47, the rails 42 and 45 being provided with eyes 48 to receive the lower ends of hoisting cables 49 and 50. The cables are trained through guide tubes 51, mounted on the upper rail 30 near the supports 32 and 35, and are connected at their upper ends to a fitting 52 (FIG. 1), for engagement by a hoist chain hook (not shown). From the foregoing description it will be understood that elevation of the dolly by the cables 49 and 50 will cause the safety bumpers 40 at each side of the dolly to move from positions depending from the intermediate side frame sections, as shown in FIG. 2, to operative positions extending laterally from the dolly, as shown in FIG. 13.

For mounting a missile component in the dolly to be transported thereby, supporting yokes 53 and 54 are employed. These yokes are shown in position in FIGS. 1 and 2 and in greater detail in FIGS. 8, 9, 10 and 13. The yokes 53 and 54 extend transversely of the dolly, being mounted on rubber shear blocks on the lower rails of the intermediate side frame sections 12, and receive the linked handling elements that surround the component and attach it to the dolly by suitable latches. A guide yoke 55, similar to the yokes 53 and 54 but not directly connected to the missile component, is also mounted to extend transversely of the dolly. More specifically, and referring now to FIGS. 8, 10, and 13, the yoke 53, which is identical to the yoke 54, is of inverted U-shape, is formed of heavy sheet metal, and comprises a central portion 56, and end portions 57 and 58 to which are secured mounting pedestals 59. The mounting pedestals 59 are secured to rubber shear blocks that are mounted on brackets on the lower rails 31 of the intermediate side frame sections 12. In FIG. 13 one of the shear blocks is shown at 60 and its associated bracket at 61.

Missile components may conveniently be attached to the yokes 53 and 54, for transport by the dolly, by structures 62, one of which is seen in FIG. 13. Each of the structures 62 includes three connected sections 63, 64, and 65 that surround the missile component and are retained in operative positions by a cable 66. The structures 62 form no part of the present invention. However, improved latches 67, shown in FIG. 10, are mounted on the yokes 53 and 54 near the ends of the central portions thereof and have pins 68 that engage in openings 69 in the upper ends of the sections 63 and 65 for connecting the structures 62, and thus the missile component, to the dolly. Such a missile component is indicated in outline at 70 in FIG. 13.

The latches 67 are identical, so that a description of one will suffice for all of them. Each latch includes a body 71 that is adjustably secured to the central portion 56 of the yoke 53 (or 54) by a bolt 72. A latch member 73 is pivotally connected to the body 71 by a link 74. As seen in FIG. 9, the latch member 73 includes spaced parallel legs between the lower ends of which is pivotally mounted the outer end of the pin 68. A handle rod 75 extends through the upper ends of the legs of the latch member, and a keeper 76, pivoted to the body 71, is engageable with the handle rod 75, between the legs of the latch member, for normally retaining the same in engaged position. When it is desired to release the latch, the keeper 76 is lifted and the handle rod 75 pulled outwardly for withdrawing the pin 68 from the opening 69 in the structure 62. Release of both of the latches 67 on one of the supporting yokes 53 or 54 will, of course, permit disengagement of the missile component from that yoke.

Adjustment of the latches 67 has been provided for by the mounting afforded by the bolts 72. More particularly, it has been found that the openings 69 in the sections 63 and 65 of the structures 62 do not always align with the pins 68 of the latches, because of differences in adjustment of the cables 66. Such differences in adjustment can be taken care of easily by loosening the bolts 72, swinging the latches to align the pins 68 thereof with the openings in the sections 63 and 65 of the structures 62, and again tightening the bolts.

To prevent too great swinging movement of the structures 62, stops 77 are provided. These stops, as best seen in FIGS. 9 and 10, consist of spaced, parallel, connected, flat metal strips that straddle the lower corners of the end portions 57 and 58 of the yokes 53 and 54 and are pivotally connected thereto by pins 78. Detents 79 engage projections 80 and limit downward swinging movement of the stops 77.

Referring again to FIGS. 1 and 2, the aft side frame sections 13 each comprise upper and lower rails 81 and 82 which are connected at their corresponding free ends by semicircular end rails 83. A tie rod 84 connects intermediate portions of the end rails 83, as seen in FIG. 1. As will be observed, the side frame sections 13 are relatively short in length, when compared with the sections 11 and 12, and thus require no braces or struts for additional support.

Mounted on the upper rails 30 and 81 of the intermediate and aft frame sections aft of the leg assemblies 25, 26, 27, and 28 are caster wheel sockets 85 which are rectangular in top plan and semicircular in side elevation. The sockets 85 are designed to receive the casters of a dolly similar to the dolly of the instant invention, for permitting stacking of the dollies and conservation of space.

The leg assemblies 25, 26, 27, and 28, previously described briefly, serve not only to connect the side frame sections but also to house shock absorber and brake operating mechanisms, and to mount casters. Since the leg assemblies are identical in construction, a description of one should be sufficient to cover all of them. Referring to FIGS. 3 through 7 and FIG. 13, a typical leg assembly 26 includes a tubular housing 86 which is attached to one end of the cross member 24. The housing is closed at its upper end by a circular cap 87 which is secured to the member 24 by bolts 88. A stem 89 having a reduced threaded upper end is secured to the cap 87 by a nut 90. The stem 89 extends axially downwardly throughout substantially three-fourths of the length of the housing 86. A shock absorber and brake actuator unit 91 is movably mounted in the housing 86 and surrounds the stem 89 throughout the major portion of its length. The unit 91 is shown in general outline in FIG. 3 and in detail in FIGS. 4 through 7.

Referring specifically to FIG. 4, the shock absorber and brake actuator unit 91 includes an upper section 92 that comprises a shock absorber cylinder 94 which is closed at its upper end by a threaded upper sleeve 95. A filler opening 96 that is normally closed by a plug 97 is formed in the sleeve, said opening communicating with the interior of the cylinder through a port 98. The sleeve 95 receives the stem 89 therethrough, said stem extending downwardly through the cylinder and through a lower sleeve 99 that closes the lower end of said cylinder. Conventional O rings 100 within the sleeves 95 and 99 prevent leakage along the stem or between the wall of the cylinder and said sleeves.

Fixed to the stem 89 within the cylinder 94 is a piston 101. The piston 101 is secured to the stem by a pin 102, and is formed with a main orifice 103 and a by-pass, or bleed, orifice 104. A snap ring 105 and bushing 106 cooperate with the pin 102 for limiting the piston 101 against downward displacement. As seen at 107 in FIG. 4, the upper end portion of the piston is removed in the area of the by-pass orifice to permit passage of fluid carried in the cylinder from one side of the piston to the other side thereof. A valve element 108 is slidable on the stem 89 above the piston 101 and is normally held in engagement with the upper end face of the piston by a coil spring 109 which surrounds the stem and is anchored at its upper end by a collar 110, said collar being fixed to the stem 89 by a setscrew 111. The valve element 108 is constituted by an annulus having a flat bottom wall 112 and a ferrule 113, the wall 112 normally closing the upper end of the orifice 103 and the ferrule 113 receiving thereabout the lower end of the spring 109. A similar ferrule 114 on the collar 110 receives the upper end portion of the spring 109 thereabout.

In FIG. 3 it will be seen that the shock absorber and brake actuator unit 91 is mounted in the housing 86, about the stem 89, with the upper end of said unit disposed in spaced relation to the cap 87. A coil spring 115 that surrounds the stem 89 provides a resilient connection between the unit 91 and said cap. To permit vertical movement of flexible brake fluid connections to the unit 91, in response to shock absorber action (to be described in more detail hereinafter), a vertical slot 116 is formed in the housing 86 within the cross member 24.

The shock absorber and brake actuator unit 91 is provided with a cylindrical lower section 117 that, as best seen in FIGS. 3 and 4, is rigidly connected to the lower end of the upper section 92 and projects downwardly within the housing 86 thereof. The section 117 is formed with a recess 118 to receive freely the lower end of the stem 89 and, beneath said recess, is provided with a caster wheel brake cylinder 119 (FIG. 7). The lower end portion of the outer wall of the section 117 is reduced in diameter, as shown at 120, to define a shoulder 121, and mounted on the portion 120 in abutting relation to the shoulder 121 is a fixed caster mount 122.

The fixed caster mount is secured against rotation on the portion 120 by a key 123, and against downward displacement by a snap ring 124. The caster mount 122 supports the lower end of a guide sleeve 125 that extends upwardly within the housing 86 and is slidably connected thereto by a bearing sleeve 126.

Mounted on the portion 120 of the section 117, beneath the fixed caster mount 122, is a rotatable caster mount 127 which, as best seen in FIG. 13, carries the elements of a caster 128, including brake linkage 129 and a caster wheel 130. A bearing 131 is positioned between the mounts 122 and 127 and a bronze sleeve 132 is interposed between the rotatable mount 127 and the portion 120. The lower end of the brake cylinder 119 is internally threaded to receive an apertured plug 133 which forms a part of a retainer 134, said retainer also including a flange 135. Setscrews 136 are carried by the flange and bear against the lower end face of lower section 117 for locking the retainer 134 in place. The retainer 134 prevents downward displacement of the rotatable caster mount 127 from the lower section 117.

A piston 137 is slidably mounted in the cylinder 119 and has a piston rod 138 that extends downwardly through the plug 133. An actuator bar 139 is secured to the lower end of the piston rod and is provided with pins 140 that extend through slots 141 in the caster yoke for connection to the brake linkage 129. A spring 142 surrounds the piston rod and normally retains the piston in its uppermost position, for maintaining the caster brake "on" and the caster wheel 130 locked against rotation. The caster brake mechanism per se is described and claimed in other patent applications assigned to the assignee of the instant application. One such application is identified as Serial No. 804,853, filed April 7, 1959, for Brake Mechanism, Beverly M. Blount, inventor, and now U.S. Patent No. 2,967,591. Release of the caster wheel is effected by downward movement of the piston 137 in response to fluid pressure applied to the upper end thereof.

Hydraulic fluid is introduced into the upper end of the cylinder 119 through a port 143, being supplied to said port by a pipe 144 that extends upwardly along the outside walls of the sections 92 and 117 of the shock absorber and brake actuator unit 91. The pipe 144 is connected at its upper end to a manifold 145 which is secured to the upper end of section 92 by a clamp 146. Hydraulic fluid is supplied to the manifold from brake mechanism 147 (FIG. 2) on the fore side frame section 11 through rigid pipe sections (not shown) on the frame section and through a flexible pipe section 148 connected to the manifold 145 (FIG. 3).

Although, as stated hereinabove, the brake mechanism does not form a part of the present invention, a brief statement of its operation is believed to be in order. Brakes are of course provided for each of the casters on the leg assemblies 25, 26, 27 and 28, and release of these brakes is effected by pumping fluid into the cylinders 119 for forcing the pistons 137 downwardly and operating the linkages 129 thereof for freeing the brake shoes employed. The fluid pumping is effected by movement of a handle 149 (FIG. 2) which is connected to the mechanism 147. Upon cessation of operation of the mechanism 147, by release of the handle 149, the springs 142 urge the pistons upwardly for re-setting the brakes. Upward movement of the pistons will, of course, force hydraulic fluid back into the system. It should also be noted that the handle 149 is spring-biased toward the in-operative position shown in dotted lines in FIG. 2, so that if said handle should be accidentally released, it will be moved to said inoperative position, and the brakes will be set.

The operation of the shock absorbers will now be briefly described. When the dolly is resting on a deck or other surface, as shown in FIGS. 1, 2, and 3, the shock absorber and brake actuator units 91 are shown fully withdrawn into the housings 86. In these positions the caster mounts 122 abut the lower ends of the housings 86 and the guide sleeves 125 are contained fully within said housings. The pistons 101 are in the positions shown in FIG. 4, i.e., near the lower ends of the cylinders 94, and the lower ends of the stems 89 extend into the recesses 118 to near the bottoms thereof.

When the dolly is elevated by the cables 49 and 50, the shock absorber and brake actuator units 91 move downwardly within the housings 86 along the stems 89, such downward movement being permitted by passage of fluid in the cylinders 94 from above the pistons 101 through the by-passes 104 to the lower ends of the cylinders. When fully extended the units 91 will assume the positions shown in FIG. 13. Upon lowering the dolly to the deck, the force of contact of the casters with the deck surface will cause the units 91 to move upwardly on the stems 86 against the compression of the spring 115. Such upward movement of the units 91 will also cause the fluid in the lower ends of the cylinders 94 to flow through the orifices 103, unseal the valve elements 108, and flow into the upper ends of the cylinders 94. Since the flow of fluid through the orifices will be at a relatively slow rate, shock to the dolly caused by sudden contact with a surface therebeneath will be effectively absorbed. After substantially all of the fluid has passed through the orifices 103, the units 91 will again be in retracted positions within the housings 86, with the caster mounts in engagement with the lower ends thereof.

Figure 11:
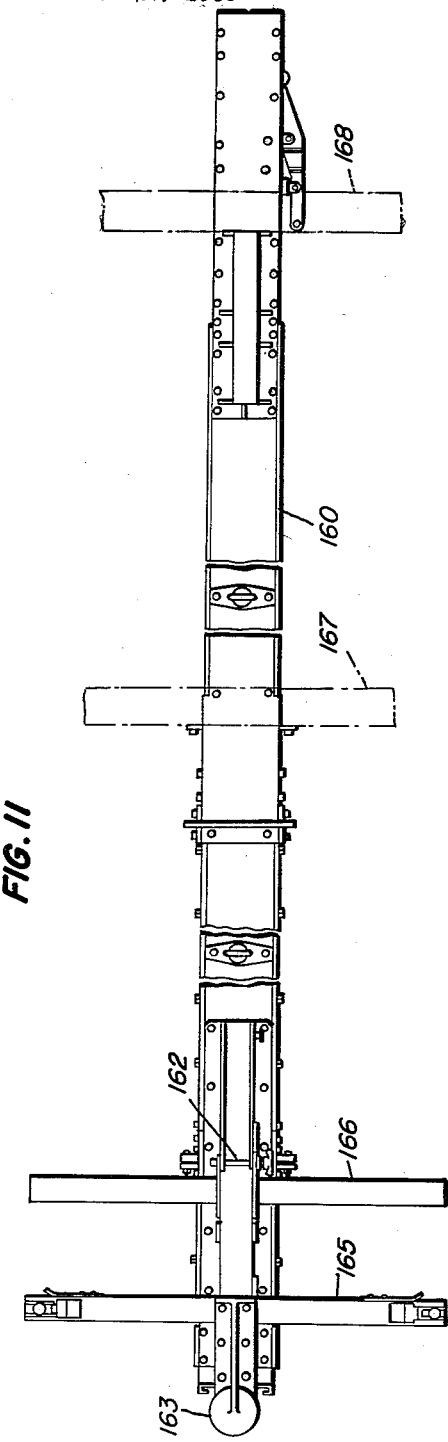
FIG. 11 is a top plan view, partially broken away, of an adapter rail for use with the improved dolly.
Figure 12:
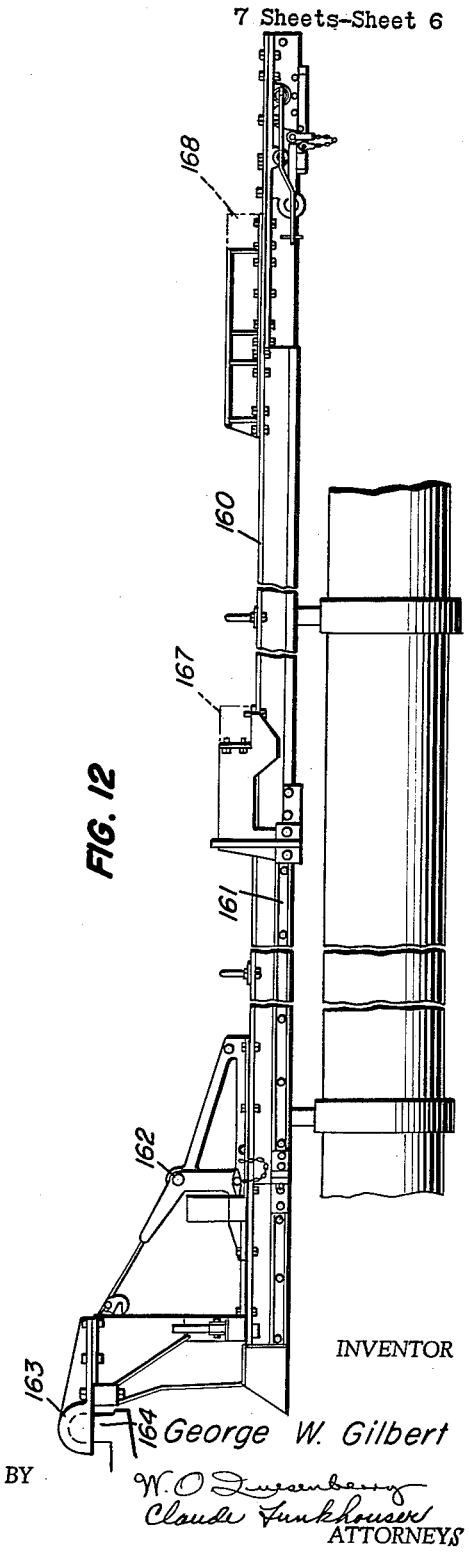
FIG. 12 is side elevation of the adapter rail shown in FIG. 11.

In FIGS. 11 and 12 there is shown in general outline an adapter rail that can be attached to the dolly and to a missile launcher, so that a missile may be transported in the dolly on said rail to a launcher and moved from the dolly directly onto the launcher. The adapter rail comprises a main beam 160 that has a track 161 thereon. The forward end portion of the beam 160 is hinged about a pivot 162, and said forward end portion 162 carries a socket connector 163 for engagement with a ball connector 164 which is mounted on a launcher (not shown). Transverse beams 165, 166, 167, and 168 mount the adapter rail on the dolly in such a manner that said rail will extend beneath the fore and aft cross members 24 and 29 thereof. Movement of a missile, shown schematically at 169 in FIG. 12, is effected by chain hoist mechanism carried on the launcher.

It is believed that the construction of the improved dolly constituting the instant invention will be understood from the fore-going description. Obviously many modifications and variations in the invention are possible in the light of the above teachings. It is therefore to be understood that within the scope of the appended claims the invention may be practiced otherwise than as specifically described.

What is claimed is:

1. A material handling dolly including pairs of side frame sections arranged in parallel spaced relation, said side frame sections including upper and lower rails, leg assemblies connecting the side frame sections at each side of the dolly, a hydraulically operated shock absorber and brake actuator unit carried by said leg assemblies, cross members connecting the leg assemblies at one side of the dolly with those at the other side of the dolly, bumpers carried on the lower rails of opposed side frame sections, and means for moving the bumpers to positions extending laterally of the dolly upon elevation of the dolly above a surface.

2. A material handling dolly as recited in claim 1, wherein said means includes cables connected to the bumpers, and guide tubes mounted on the upper rails and receiving the cables therethrough.

3. A material handling dolly including a body, means carried by the body for supporting material to be handled, leg assemblies for supporting the body on a surface, said leg assemblies each comprising a housing, a stem fixed in the housing, a hydraulically operated shock absorber and brake actuator unit in the housing and having an upper section slidably receiving the stem therethrough, shock absorber means in the upper section, a lower section secured to the upper section, a caster carried by the unit and having a brake, and brake actuating means carried by the lower section.

4. A material handling dolly as recited in claim 3, wherein the shock absorber means includes a cylinder in the upper section, a piston on the stem, and having an orifice, said cylinder being slidable with respect to the piston, and hydraulically operated means movable on the stem and cooperating with the piston for controlling hydraulic fluid flow through the orifice upon movement of the upper section with respect to the stem in response to a shock applied to the lower end of the shock absorber and brake actuator unit.

5. The structure recited in claim 4, wherein said hydraulically operated means includes a fluid responsive valve element, a collar fixed to the stem, and a spring surrounding the stem between the collar and fluid responsive valve element and urging said element toward the piston to cover the orifice therein.

6. A material handling dolly including a body, means carried by the body for supporting material to be handled, leg assemblies for supporting the body above a surface, casters on the leg assemblies, caster wheel sockets carried on the body to receive the casters of a second dolly to permit the stacking of dollies one above the other, and a hydraulically operated shock absorber and brake actuator unit disposed within said leg assemblies.

7. A material handling dolly including a body, means carried by the body for supporting material to be handled, leg assemblies for supporting the body above a surface, said leg assemblies each comprising a housing, a stem fixed in the housing, a hydraulically operated shock absorber and brake actuator unit in the housing and having an upper section slidably receiving the stem therein and a lower section secured to the upper section, a caster secured to the lower section and having brake elements thereon, and hydraulically operated brake actuating mechanism carried by the lower section and operatively connected to the brake elements.

8. A material handling dolly as recited in claim 7, wherein said brake actuating mechanism includes a cylinder in the lower section, a hydraulically operated piston in the cylinder, fluid connections to the cylinder within the housing, an actuator bar connected to the brake elements, and a piston rod connecting the piston to the actuator bar.

9. A material handling dolly as recited in claim 8, wherein said fluid connections include a manifold on the upper section, and a clamp securing the manifold to the upper section.

10. A material handling dolly including a body, means carried by the body for supporting material to be handled, leg assemblies for supporting the body above a surface; said leg assemblies each comprising a housing, a cap closing the housing at its upper end, a stem axially in the housing and fixed to the cap, a hydraulically operated shock absorber and brake actuator unit in the housing and slidable on the stem, a spring between the cap and the upper end of said unit, shock absorber means in the unit, and a caster secured to the lower end of the unit and rotatable thereon.

11. In a material handling dolly having a body, a plurality of leg assemblies for supporting the body on a surface, each of said leg assemblies including a housing rigidly secured to the body, a hydraulically operated shock absorber and brake actuator unit, a caster on said unit, and means movably mounting said unit within the housing, said means including a stem in the housing and slidable with respect to the unit, and a spring about the stem between the housing and the upper end of the unit.

12. A material handling dolly including a body having mutually spaced side frames and fore and aft cross members connecting said side frames, means carried by said cross members for releasably supporting material to be handled, leg assemblies carried by said frames and cross members, said leg asemblies each comprising a housing carried by the side frames and cross members, a stem disposed within and secured to said housing, a hydraulically operated shock absorber and brake actuator unit disposed within the housing and having an upper cylindrical section slidably receiving the stem therethrough, a piston on the stem and disposed within said upper cylindrical section and having an orifice therein, said upper cylindrical section being slidable with respect to the piston, a hydraulically operated valve movable on the stem and normally sealing said orifice in the piston for controlling hydraulic fluid through said orifice upon movement of the upper cylindrical section with respect to the stem, a collar fixed to said stem, a spring surrounding the stem in engagement with the collar and valve for maintaining the valve in sealing engagement with said orifice, a lower cylindrical section connected to said upper cylindrical section and disposed within the housing, a normally locked caster disposed at the terminal end of lower cylindrical section, a chamber within said lower cylindrical section, a fluid responsive piston disposed within said chamber, means disposed within said housing for establishing a fluid connection to said chamber, and actuating means connected to said fluid responsive piston and movable by the actuating means from a caster locking position to a caster release position.

13. A material handling dolly including spaced parallel side frames, opposed leg assemblies connected to said side frames at each side thereof and comprising a housing secured thereto, a stem disposed within and secured to said housing, an upper cylindrical member having a lower cylindrical member secured thereto and disposed within the housing, said upper cylindrical member slidably receiving the stem, a piston disposed within said upper cylindrical member, and secured to said stem, an orifice in said piston, said upper cylindrical member being slidable with respect to the piston, a hydraulically operated valve means movable on said stem and normally sealing said orifice and cooperating with the piston for controlling hydraulic fluid flow through the orifice upon movement of the upper cylindrical member with respect to the stem in response to a sudden shock applied to said lower cylindrical member, a normally locked caster operatively connected to the terminal end of said lower cylindrical member, resilient means surrounding the stem in engagement therewith and with the valve means for maintaining the valve means in sealing engagement with said orifice until said upper cylindrical member has been moved, a fluid operated piston disposed within said chamber, a conduit carried by said housing in communicating with said chamber for establishing fluid communication therebetween, and an actuating rod carried by and operated by said fluid operated piston and movable from a caster locking position to a caster release position.

References Cited in the file of this patent

UNITED STATES PATENTS

| | | |
|---|---|---|
| 1,830,998 | Harbord | Nov. 10, 1931 |
| 2,105,246 | Horsfield | Jan. 11, 1938 |
| 2,253,824 | Townsend et al. | Aug. 26, 1941 |
| 2,608,313 | Wilson | Aug. 26, 1952 |
| 2,723,770 | Gretener | Nov. 15, 1955 |
| 2,729,196 | Breitenbach | Jan. 3, 1956 |
| 2,851,235 | Henig | Sept. 9, 1958 |
| 2,901,201 | Taylor et al. | Aug. 25, 1959 |
| 2,925,980 | Nearman | Feb. 23, 1960 |
| 2,950,123 | Nearman | Aug. 23, 1960 |
| 2,967,591 | Blount | Jan. 10, 1961 |
| 2,981,548 | Taylor | Apr. 25, 1961 |
| 2,982,395 | Rados | May 2, 1961 |
| 2,996,310 | Culver | Aug. 15, 1961 |
| 2,999,693 | Thorson | Sept. 12, 1961 |
| 3,018,129 | Culver | Jan. 23, 1962 |